US012400583B2

(12) United States Patent
Jang et al.

(10) Patent No.: US 12,400,583 B2
(45) Date of Patent: Aug. 26, 2025

(54) DISPLAY DEVICE CONTROLLING BRIGHTNESS USING MULTIPLE PWM SOURCE SIGNALS

(71) Applicant: SAPIEN SEMICONDUCTORS INC., Gyeonggi-do (KR)

(72) Inventors: Jin Woong Jang, Gyeonggi-do (KR); Sung Ho Hwang, Gyeonggi-do (KR); Hye Min Bae, Gyeonggi-do (KR)

(73) Assignee: SAPIEN SEMICONDUCTORS INC., Gyeonggi-do (KR)

( * ) Notice: Subject to any disclaimer, the term of this patent is extended or adjusted under 35 U.S.C. 154(b) by 0 days.

(21) Appl. No.: 18/637,344

(22) Filed: Apr. 16, 2024

(65) Prior Publication Data

US 2024/0346987 A1 Oct. 17, 2024

(30) Foreign Application Priority Data

Apr. 17, 2023 (KR) ........................ 10-2023-0049779

(51) Int. Cl.
*G09G 3/32* (2016.01)

(52) U.S. Cl.
CPC ....... *G09G 3/32* (2013.01); *G09G 2310/0243* (2013.01); *G09G 2310/0286* (2013.01); *G09G 2310/0297* (2013.01); *G09G 2320/064* (2013.01)

(58) Field of Classification Search
CPC ............. G09G 3/32; G09G 2310/0243; G09G 2310/0286; G09G 2310/0297; G09G 2320/064; G09G 3/2022
See application file for complete search history.

(56) References Cited

U.S. PATENT DOCUMENTS

2022/0335882 A1* 10/2022 Kwon .................. G09G 3/2022

FOREIGN PATENT DOCUMENTS

KR 10-2012-0107380 A 10/2012
KR 10-2020-0101605 A 8/2020
KR 10-2022-0144264 A 10/2022

OTHER PUBLICATIONS

KIPO Office action for corresponding Application No. KR 20230049779 mailed May 21, 2024.

* cited by examiner

*Primary Examiner* — Abdul-Samad A Adediran
(74) *Attorney, Agent, or Firm* — Rankin, Hill & Clark LLP

(57) ABSTRACT

Provided is a display device that controls brightness using a plurality of PWM source signals. The display device includes a display panel including a plurality of pixels forming a plurality of rows and a plurality of columns, and a PWM driving circuit including a unit driving circuit connected to each of a plurality of lines corresponding to the plurality of rows or the plurality of columns, wherein the PWM driving circuit sequentially applies PWM signals output from the unit driving circuits to the plurality of lines to control the brightness of the plurality of pixels for each line the brightness of the plurality of pixels may be controlled for each line.

9 Claims, 9 Drawing Sheets

DISPLAY DEVICE CONTROLLING BRIGHTNESS USING MULTIPLE PWM SOURCE SIGNALS

CROSS-REFERENCE TO RELATED APPLICATION

This application is based on and claims priority under 35 USC § 119 to Korean Patent Application No. 10-2023-0049779, filed on Apr. 17, 2023, in the Korean Intellectual Property Office, the disclosure of which is incorporated by reference herein in its entirety.

TECHNICAL FIELD

The present disclosure to a display device that controls brightness using multiple PWM source signals.

BACKGROUND

A typical display device includes a plurality of pixels and is composed of M*N pixels. Each pixel may include one or more light-emitting elements, generally three light-emitting elements (R, G, and B).

One approach to drive light-emitting elements is a pulse width modulation (PWM) driving method which uses PWM signals. In this regard, the PWM signal stores the image information related to the driving of the light-emitting element in the pulse width, and the PWM signal may be generated from a PWM source signal.

When using one PWM source signal, if the PWM source signal is changed to control the brightness of the light-emitting element, the pulse width of the PWM signal input to the pixel is changed. In this regard, the image information of the PWM signal is corrupted, causing unnatural brightness variations in the display, which degrades the quality of a display panel. Therefore, there is a growing demand for PWM signal control technology for natural brightness variations in the display.

The above-mentioned background technology is technical information that the inventor had in his/her possession for deriving the present disclosure or acquired in the process of deriving the present disclosure, and is not necessarily said to be known art disclosed to the general public prior to the filing of the application.

BRIEF SUMMARY

Embodiments of the present disclosure are directed to a display device controlling brightness using multiple pulse width modulation (PWM) source signals. The problems to be solved by the present disclosure are not limited to those mentioned above, and other problems and advantages of the present disclosure not mentioned may be understood through the following description, which will be more clearly understood by embodiments of the present disclosure In addition, it will be appreciated that the problems and advantages to be solved by the present disclosure may be realized by the means and combinations thereof described in the patent claims.

Additional aspects will be set forth in part in the description which follows and, in part, will be apparent from the description, or may be learned by practice of the presented embodiments of the disclosure.

In a first aspect of the present disclosure, a display device includes a display panel including a plurality of pixels forming a plurality of rows and a plurality of columns, and a PWM driving circuit including a unit driving circuit connected to each of a plurality of lines corresponding to the plurality of rows or the plurality of columns, wherein the PWM driving circuit sequentially applies PWM signals output from the unit driving circuits to the plurality of lines to control the brightness of the plurality of pixels for each line.

In a second aspect of the present disclosure, a display device includes a display panel having an arrangement of a plurality of pixel driving circuits forming rows and columns, a scan driving circuit configured to sequentially output row signals to the pixel driving circuits arranged in a row direction in the arrangement of the display panel, and a data driving circuit configured to output column signals related to the driving of light-emitting elements respectively corresponding to the plurality of pixel driving circuits to the pixel driving circuits arranged in a column direction in the arrangement of the display panel, wherein the driving circuit operates with the PWM driving circuit according to the first aspect.

In a third aspect of the present disclosure, a driving circuit includes one or more flip-flops configured to output a brightness control signal, a multiplexer configured to select any one of a plurality of PWM source signals according to the brightness control signal, and a logic circuit configured to control the output of the brightness control signal by inputting a clock signal to the one or more flip-flops, wherein the clock signal is sequentially input to the one or more flip-flops with a predetermined delay time interval in response to a brightness change command applied to the logic circuit.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
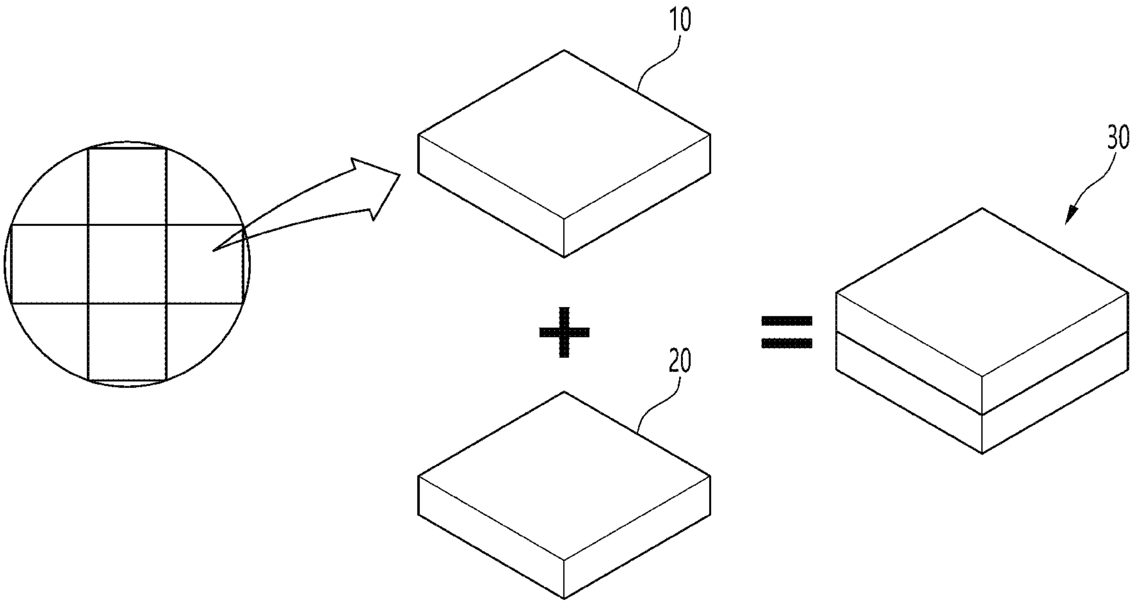
FIG. 1 is a diagram schematically illustrating the manufacturing process of a display device according to an embodiment of the present disclosure.

References will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The advantages and features of the present disclosure, and methods for achieving them will become apparent by referring to embodiments to be described in detail together with the accompanying drawings. However, the present disclosure is not limited to the embodiments presented below, but may be implemented in various different forms, and should be understood to include all transformations, equivalents, and substitutes included in the spirit and technical scope of the present disclosure. The embodiments presented below are provided so that this disclosure will be thorough and complete, and will fully convey the scope of the invention to those skilled in the art to which the present disclosure pertains. In describing the present disclosure, it is to be noted that, when a detailed description of related known technology may obscure the gist of the present disclosure, the detailed description will be omitted.

The terminology used in the embodiments has been chosen to be as generic as possible in current common usage, but may vary according to the intent or precedent of those skilled in the art, the emergence of new technologies, etc. In addition, in certain cases, there are terms arbitrarily selected by the applicant, and in this case, the meaning will be described in detail in the relevant description. Therefore, terms used in the specification should be defined based on the meaning of the terms and the overall content of the specification, not just the name of the term.

The terms used in this application are only used to describe specific embodiments and are not intended to limit the disclosure. As used herein, the singular forms are intended to include the plural forms as well, unless the context clearly indicates otherwise. It will be understood that the terms "comprise" or "have," when used in this specification, specify the presence of stated features, integers, steps, operations, components, parts, or combinations thereof described in the specification, but do not preclude the presence or addition of one or more other features, integers, steps, operations, components, parts, or combinations thereof.

Additionally, terms including ordinal numbers, such as "first" or "second," used in the specification may be used to describe various components, but the components should not be limited by the terms. The above terms may be used for the purpose of distinguishing one component from another component.

Referring one element to as being "connected to" another element includes both direct connection of one element to the other element or intervening other elements between the two elements.

Hereinafter, specific embodiments of the present disclosure will be described in detail with reference to the drawings.

In addition, in describing the present disclosure, it is to be noted that, when a detailed description of related known configurations and functions may obscure the gist of the present disclosure, the detailed description will be omitted.

FIG. 1 is a diagram schematically illustrating the manufacturing process of a display device according to an embodiment of the present disclosure.

Referring to FIG. 1, the display device 30 according to the embodiment may include a light-emitting element array 10 and a driving circuit board 20. The light-emitting element array 10 may be combined with the driving circuit board 20.

The light-emitting element array 10 may include a plurality of light-emitting elements. The light-emitting element may be a light-emitting diode (LED). In this regard, the light-emitting diode may be a micro LED with a size of 80 μm or less.

In an embodiment, at least one light-emitting element array may be manufactured by growing a plurality of light-emitting diodes on a semiconductor wafer (silicon wafer, SW). Accordingly, the display device 30 may be manufactured by combining the light-emitting element array 10 with the driving circuit board 20 without the need to individually transfer the light-emitting diodes to the driving circuit board 20.

Pixel circuits respectively corresponding to light-emitting elements on the light-emitting element array 10 may be arranged on the driving circuit board 20. The light-emitting elements on the light-emitting element array 10 and the pixel circuits on the driving circuit board 20 may be electrically connected to form pixels PXs.

Figure 2:
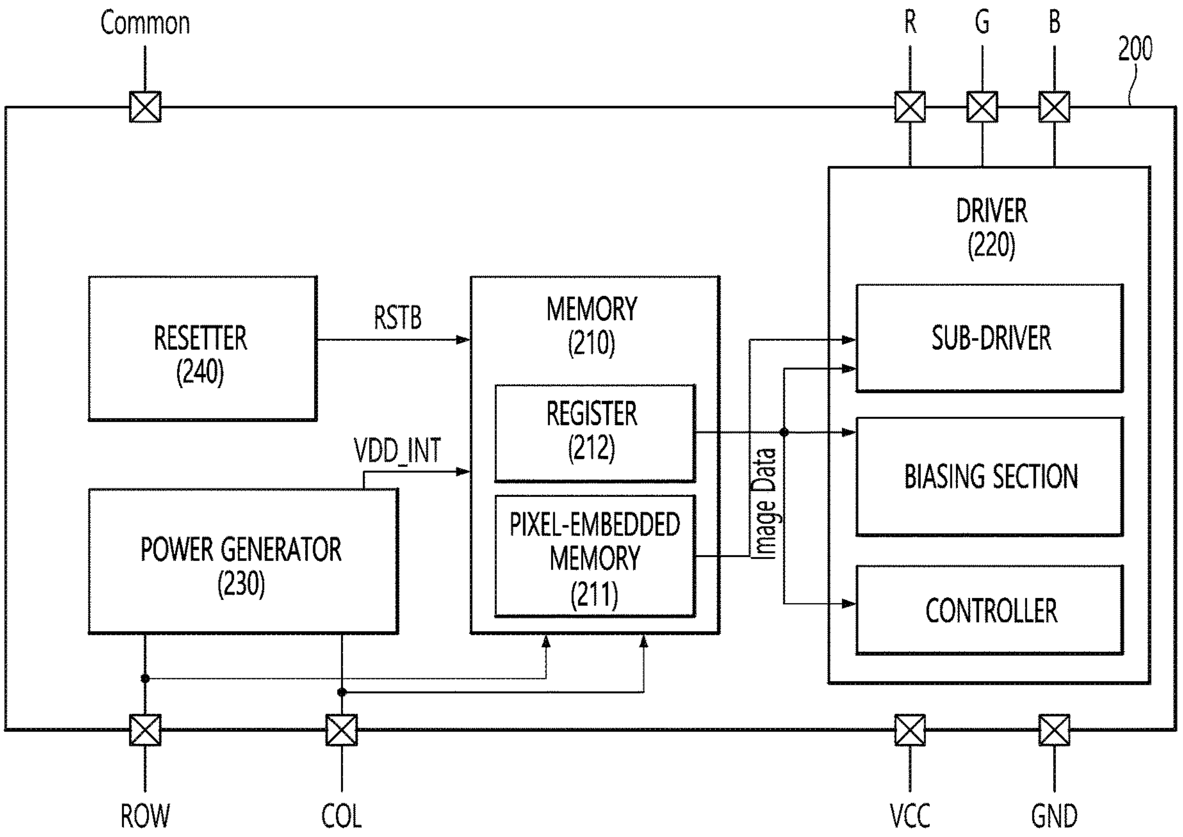
FIG. 2 is a block diagram schematically illustrating the configuration of a pixel driving circuit according to an embodiment of the present disclosure.

FIG. 2 is a block diagram schematically illustrating the configuration of a pixel driving circuit according to an embodiment of the present disclosure.

Referring to FIG. 2, the pixel driving circuit 200 according to the embodiment of the present disclosure may include a memory 210, a driver 220, a power generator 230, and a resetter 240. The pixel driving circuit 200 illustrated in FIG. 2 may be the same as or perform the same function as the driving circuit board 20 or the pixel circuit of FIG. 1.

The pixel driving circuit 200 may include terminals VCC and GND for receiving power, terminals R, G, B for outputting light emission control signals to the light-emitting element, a terminal ROW for receiving a row signal output from a scan driving circuit, and a terminal COL for receiving a column signal output from a data driving circuit. Electrical connections may be made so that power and signals may be input and output via the aforementioned terminals.

In the present disclosure, the memory 210 may store data related to the driving of a light-emitting element. In an embodiment, the memory 210 may include a pixel-embedded memory 211 and a register 212. The pixel-embedded memory 211 may store data related to the driving of a light-emitting element (e.g., LED), that is, video data. Video data is data about the gradation at which a light-emitting element emits light during one frame or one pulse width modulation (PWM) cycle. In an embodiment, the pixel-embedded memory 211 may store data related to the charging of a capacitor (not illustrated) that may be included in the driver 220.

In the present disclosure, the driver 220 may supply power to the light-emitting element based on data stored in the memory 210. Specifically, the driver 220 may supply power to the light-emitting element based on data stored in the pixel-embedded memory 211. In an embodiment, the driver 220 may be configured to control a supply of power to the light-emitting element according to a PWM driving method. For example, the driver 220 may be configured to control the supply of power to the light-emitting element by receiving a PWM signal from a PWM driving circuit. Since the PWM driving method is a technology known to those skilled in the art, a detailed description about a method by which the PWM driving circuit outputs the PWM signal will be described later with reference to FIGS. 4 to 9.

In an embodiment, a biasing section may supply bias power to the driver 220. To supply bias power, the biasing section may be connected to a power receiving terminal VCC.

The pixel driving circuit 200 of the present disclosure may further include the power generator 230. The power generator 230 may output a reference voltage VDD to the memory 210 using a row signal output from the scan driving circuit and a column signal output from the data driving circuit.

The pixel driving circuit 200 of the present disclosure may include the resetter 240 that controls the initialization of the memory 210. Specifically, the resetter 240 may generate a reset signal RSTB and output the reset signal to the memory 210.

Figure 3:
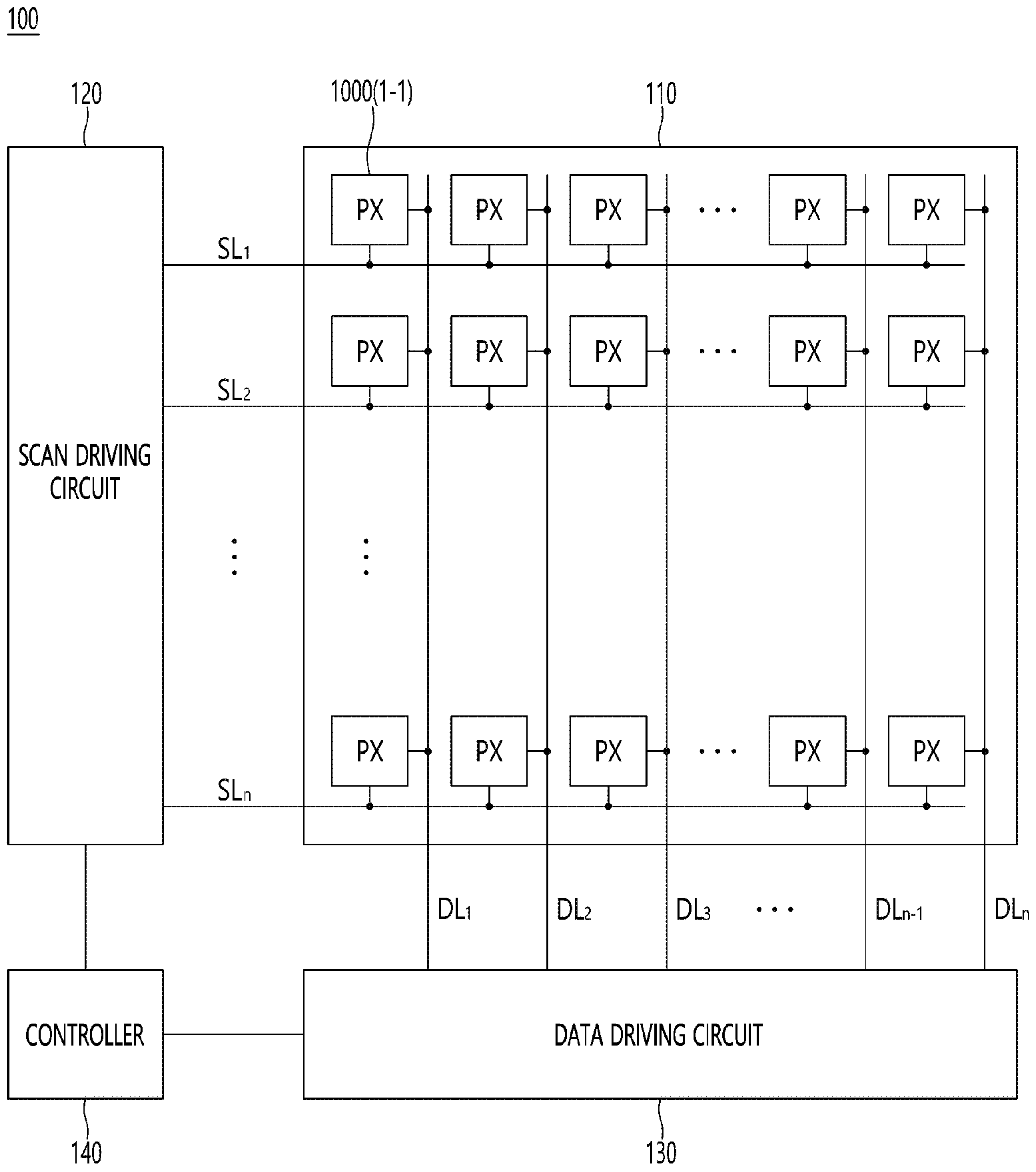
FIG. 3 is a display device including a plurality of pixel driving circuits according to an embodiment of the present disclosure.

FIG. 3 illustrates a display device including a plurality of pixel driving circuits according to an embodiment of the present disclosure.

Referring to FIG. 3, the display device 100 according to the embodiment of the present disclosure may include a display panel 110, a scan driving circuit 120, a data driving circuit 130, and a controller 140.

In the present disclosure, the display panel 110 may include a plurality of pixels PXs. The display device 100 may be the same as the display device 30 of FIG. 1, and the plurality of pixels PXs may be the same as the pixels PXs described above in FIG. 1.

In an embodiment, although a plurality of pixels PXs is illustrated in FIG. 3 so that n*n pixels are arranged in a matrix form, the plurality of pixels PXs may be configured so that M*N (which are different natural numbers) pixels are arranged in a matrix form. As an example, the plurality of pixels PXs may form a plurality of rows and a plurality of columns.

However, the plurality of pixels PX may be arranged in various patterns, such as a zigzag pattern, or the like, according to different embodiments. In other words, the plurality of rows and the plurality of columns are not necessarily orthogonal or composed of straight lines, but may mean different predetermined axes that exist in not only two dimensions but also three dimensions.

Hereinafter, the plurality of rows or the plurality of columns will be defined as a plurality of lines. In other words, a line means either a row or a column, so performing a specific operation for each line may mean performing the operation for each row or column.

In the present disclosure, the display panel 110 may be implemented as one of liquid crystal displays (LCD), light-emitting diode (LED) displays, organic LED (OLED) displays, active-matrix OLED (AMOLED) displays, micro-LED (μ-LED) displays, electrochromic displays (ECD), digital mirror devices (DMD), actuated mirror devices (AMD), grating light valves (GLV), plasma display panels (PDP), electro-luminescent displays (ELD), and vacuum fluorescent displays (VFD), and may be implemented as other types of flat displays or flexible displays. In the present disclosure, as an example, the display panel 110 is described as being implemented as an LED display.

In the present disclosure, each of the plurality of pixels PXs may include one or more light-emitting elements. In this regard, the light-emitting element may refer to a light-emitting element included in the light-emitting element array 10 of FIG. 1.

In an embodiment, one pixel PX may output various colors via a plurality of light-emitting elements having different colors. As an example, one pixel PX may include light-emitting elements emitting light of red, green, and blue. As another example, one pixel PX may further include a white light-emitting element, which may replace any one of the red, green, and blue light-emitting elements. As a still another example, one pixel PX may be composed of one white light-emitting element.

In an embodiment, each pixel PX may include a pixel driving circuit that drives at least one light-emitting element included in the pixel. Specifically, the pixel driving circuit may drive turn-on or turn-off operations of the light-emitting elements in response to signals output from the scan driving circuit 120 and/or the data driving circuit 130. In an embodiment, the pixel driving circuit may include at least one thin film transistor, at least one capacitor, etc. In an embodiment, the pixel driving circuit may be implemented by a stacked structure on a semiconductor wafer. Additionally, the pixel driving circuit may include a memory that stores signals (data) for driving at least one light-emitting element.

In the present disclosure, the display panel 110 may include one or more scan lines $SL_1$ to $SL_n$ arranged in a row direction, and one or more data lines DL to $DL_n$ arranged in a column direction. In the present disclosure, a pixel PX may be located at an intersection point of one or more scan lines $SL_1$ to $SL_n$ and one or more data lines $DL_1$ to $DL_n$. Each pixel PX may be connected to any one of scan lines $SL_x$ and any one of data lines $DL_x$. One or more scan lines $SL_1$ to $SL_n$ may be connected to the scan driving circuit 120, and one or more data lines $DL_1$ to $DL_n$ may be connected to the data driving circuit 130.

In FIG. 3, for convenience of explanation, it is illustrated that the scan lines $SL_1$ to $SL_n$ are arranged in the row direction and the data lines $DL_1$ to $DL_n$ are arranged in the column direction, but the present disclosure is not limited thereto. In other words, the scan lines $SL_1$ to $SL_n$ may be arranged in the column direction, and the data lines $DL_1$ to $DL_n$ may be arranged in the row direction. In this case, the scan driving circuit 120 and the data driving circuit 130 may be arranged to be connected to the scan lines $SL_1$ to $SL_n$ and the data lines DL1 to DLn, respectively.

In the present disclosure, the scan driving circuit 120 may output a signal (hereinafter referred to as a row signal) to drive one or more pixels connected to any one of one or more scan lines ($SL_1$ to $SL_n$). Preferably, the scan driving circuit 120 may sequentially select one or more scan lines ($SL_1$ to $SL_n$). For example, a pixel connected to a first scan line $SL_1$ may be driven during a first scan driving period, and a pixel connected to a second scan line $SL_2$ may be driven during a second scan driving period. That is, the row signal may correspond to a clock signal for controlling the driving of the light-emitting element.

In the present disclosure, the scan driving circuit 120 may operate as a PWM driving circuit according to an embodiment. Herein, the row signal may include a PWM signal output by a PWM driving circuit. Accordingly, the PWM driving circuit may control the driving of pixels for each scan line ($SL_1$ to $SL_n$).

In the present disclosure, the data driving circuit 130 may output gradation-related signals (hereinafter referred to as column signals) to respective pixels through one or more data lines $DL_1$ to $DL_n$. That is, the column signal may correspond to a bit value of image data. Although one data line is connected to one or more pixels in the longitudinal direction, the gradation-related signals may be input to only pixels connected to the scan line selected by the scan driving circuit 120.

In the present disclosure, the controller 140 may output control signals to execute the operations of the scan driving circuit 120 and the data driving circuit 130. The controller 140 may output a control signal corresponding to image data obtained for one image frame to the scan driving circuit 120 or the data driving circuit 130.

In the present disclosure, the controller 140 may further include a logic circuit that generates a control signal. Specifically, the logic circuit may control the output of the row signal by inputting a clock signal to the scan driving circuit 120.

Figure 4:
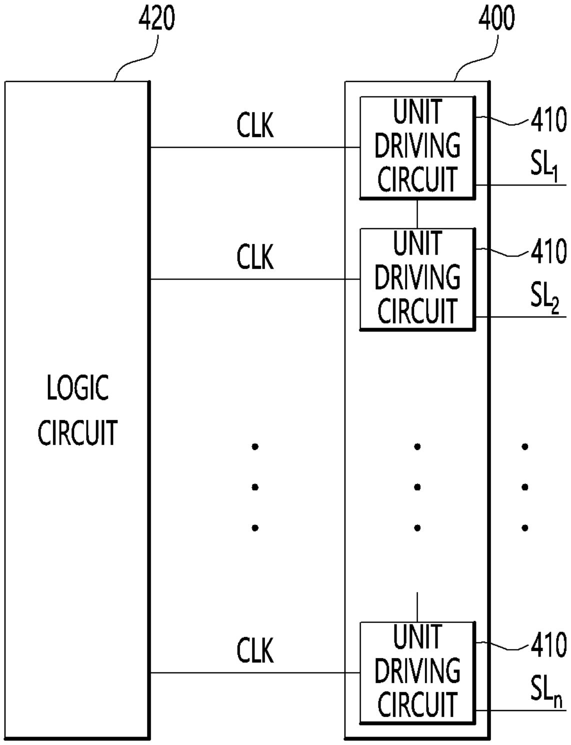
FIG. 4 is a block diagram schematically illustrating a logic circuit and unit driving circuits according to an embodiment of the present disclosure.

FIG. 4 is a block diagram schematically illustrating a logic circuit and unit driving circuits according to an embodiment of the present disclosure.

Referring to FIG. 4, a PWM driving circuit 400 may include unit driving circuits 410 respectively connected to a plurality of lines $SL_1$ to $SL_n$. Although FIG. 4 illustrates an embodiment in which the unit driving circuits 410 are connected to the plurality of scan lines $SL_1$ to $SL_n$, i.e., a plurality of rows, the unit driving circuits 410 may be connected to a plurality of data lines $DL_1$ to $DL_n$, i.e., a plurality of columns.

In an embodiment, the PWM driving circuit 400 may control the brightness of a plurality of pixels for each line by sequentially applying PWM signals output from the unit driving circuits 410 to the plurality of lines $SL_1$ to $SL_n$. As an example, assuming that the plurality of lines $SL_1$ to $S_n$ are defined from the top as a first line $SL_1$, a second line $SL_2$, . . . , and a n-th line $SL_n$, the unit driving circuits 410 may output PWM signals and sequentially apply the PWM signals to the plurality of lines from the first line $SL_1$ to the n-th line $SL_n$.

In this regard, the unit driving circuits 410 may apply PWM signals with predetermined delay time intervals for respective lines. This predetermined delay time is not a delay time that naturally occurs when a signal passes through a circuit or system, but an intentionally set time that may be preset to naturally change the brightness of the display panel.

In an embodiment, each unit driving circuit 410 may be connected to a logic circuit 420 that controls the output of the PWM signals. As an example, the logic circuit 420 may control the output of the PWM signals by inputting clock signals to the unit driving circuits 410 at different timings. That is, the above-mentioned predetermined delay time intervals may be implemented by the logic circuit 420.

Figure 5:
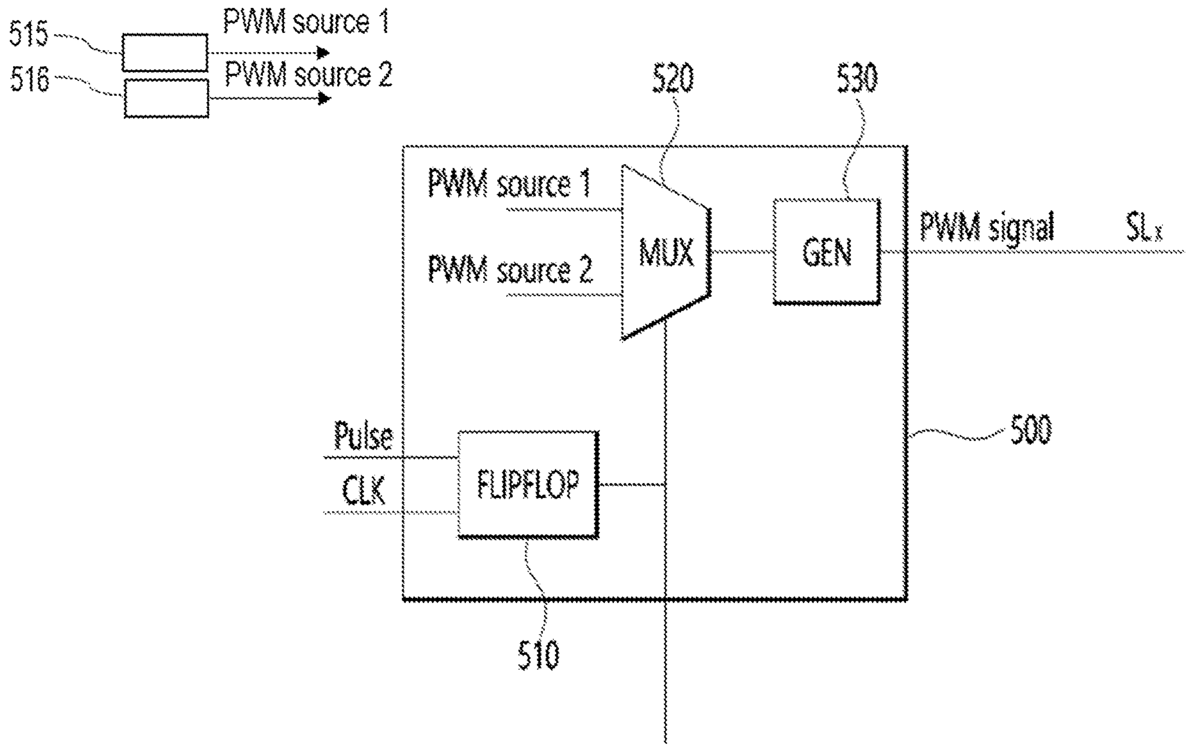
FIG. 5 is a block diagram illustrating a unit driving circuit according to an embodiment of the present disclosure.

FIG. 5 is a block diagram illustrating a unit driving circuit according to an embodiment of the present disclosure.

Referring to FIG. 5, the unit driving circuit 500 may include one or more flip-flops (FF) 510 and a multiplexer (MUX) 520. The unit driving circuit 500 may be the same as the unit driving circuit 410 of FIG. 4.

Although one flip-flop 510 and a 2:1 multiplexer 520 are illustrated in FIG. 5, a plurality of flip-flops 510 may be provided. For example, when the unit driving circuit 500 includes m (m is a natural number of 2 or more) flip-flops 510, the multiplexer 520 may be a $2^m$:m multiplexer. An embodiment in which the unit driving circuit 500 includes a plurality of flip-flops 510 will be described later with reference to FIG. 8.

In an embodiment, the flip-flop 510 may output a brightness control signal to the multiplexer 520. The flip-flop 510 is a 1-bit memory element with a clock input and may be used as a brightness control resistor in a PWM driving circuit. As an example, the flip-flop 510 may be an SR flip-flop, a JK flip-flop, a T flip-flop, or a D flip-flop.

In an embodiment, the flip-flop 510 may include a pulse terminal and a clock terminal. The flip-flop 510 may be a synchronous sequential logic circuit that outputs a pulse signal Pulse input to the pulse terminal and changes the output state only by a clock signal CLK input to the clock terminal. For example, when a clock signal CLK that transitions from a low state (state 0) to a high state (state 1) is input to the clock terminal, the pulse signal Pulse being input to the pulse terminal at the time the clock signal is input may be output.

In an embodiment, the multiplexer 520 may select any one of a plurality of PWM source signals including PWM source 1 and PWM source 2 based on the brightness control signal. The plurality of PWM source signals may have different brightness information. Each PWM source signals are generated to have different pulse widths by PWM source generators 515, 516. Accordingly, the PWM source signal selected by the multiplexer 520 is output to the line $SL_x$ connected to the multiplexer 520, so that the brightness of the pixels forming the corresponding line $SL_x$ may be controlled.

In an embodiment, the unit driving circuit 500 may further include a PWM signal generator 530 that generates a PWM signal based on the PWM source signal selected by the multiplexer 520. The PWM signal generated from the PWM signal generator 530 is output to the connected line $SL_x$ to control the brightness of the pixels constituting the line $SL_x$.

Figure 6:
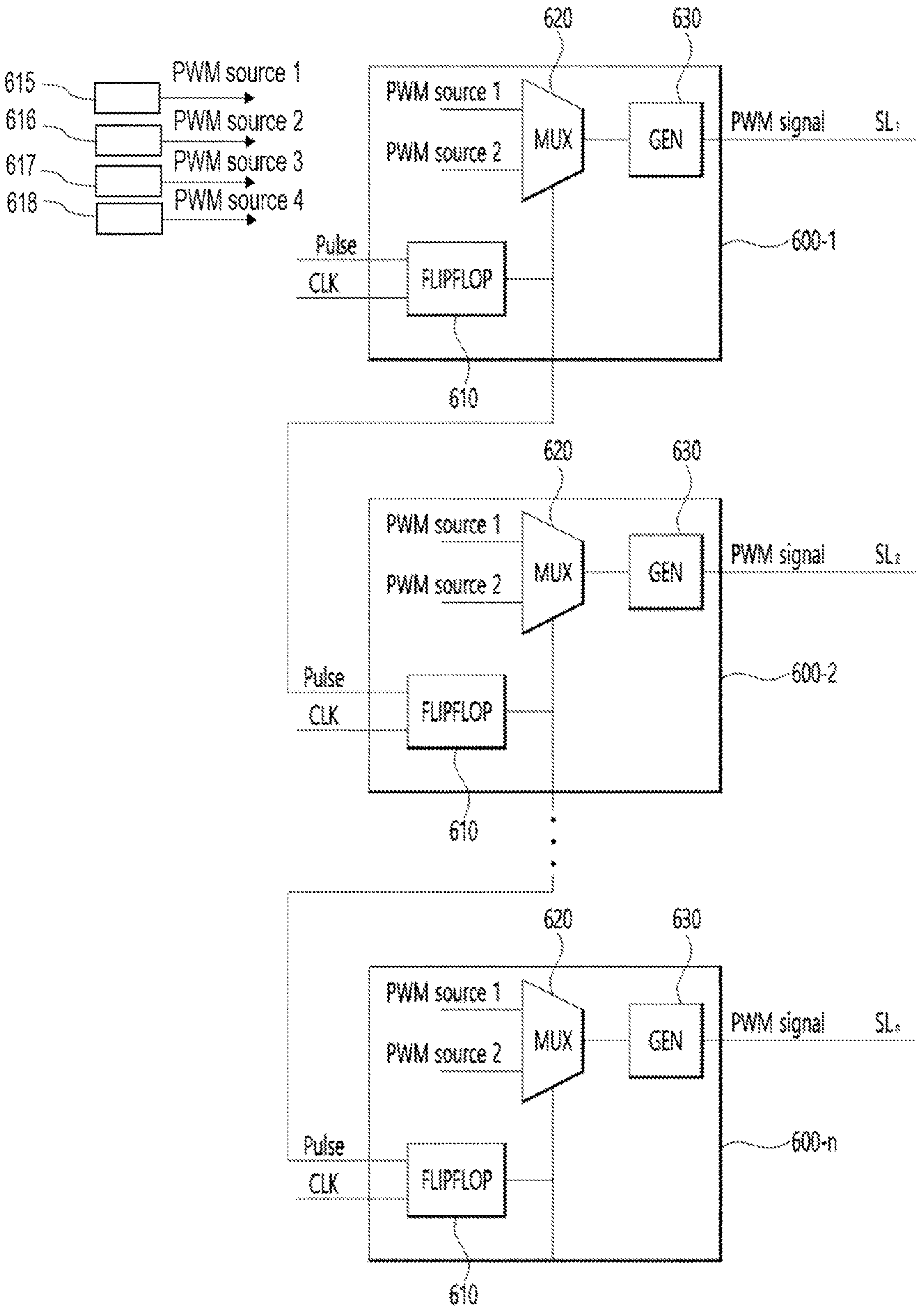
FIG. 6 is a block diagram illustrating the connection relationship of unit driving circuits according to an embodiment of the present disclosure.

FIG. 6 is a block diagram illustrating the connection relationship of unit driving circuits according to an embodiment of the present disclosure.

The unit driving circuits 600-1, 600-2, . . . , **600-*n* in FIG. 6 may be the same as the unit driving circuit 500 in FIG. 5. Likewise, the flip-flop 610, the multiplexer 620, and the PWM signal generator 630 may be the same as the flip-flop 510, the multiplexer 520, and the PWM signal generator 530 in FIG. 5**.

In the present disclosure, at least one flip-flop 610 is included in each of the unit driving circuits 600-1, 600-2, . . . , **600-*n*, and the unit driving circuits 600-1, 600-2, . . . , 600-*n* exist as many as lines $SL_1$, $SL_2$, . . . , $SL_n$ that constitute the display panel. Accordingly, it may be seen that there are a plurality of flip-flops 610 included in the PWM driving circuit. In this regard, the plurality of flip-flops 510 may be connected in the form of a scan chain to form a shift register. The shift register is a register that may shift binary information one stage for each clock signal CLK. The shift register may be formed to have a structure in which a plurality of flip-flops 510** is connected in series.

In an embodiment, the flip-flop 610 connected to an arbitrary line ($SL_x$, x is a natural number greater than or equal to 1 less than the number n of lines) may output a brightness control signal to the multiplexer 620 as well as a flip-flop 610 connected to the next line ($SL_{x+1}$, not illustrated). Specifically, the brightness control signal output from the flip-flop 610 connected to the arbitrary line $SL_x$ may be input as a pulse signal Pulse of the flip-flop 610 connected to the next line $SL_{x+1}$. The flip-flop 610 connected to the next line $SL_{x+1}$ may receive the clock signal CLK after a predetermined delay time interval from a logic circuit at a clock terminal, and may output the pulse signal Pulse input from the flip-flop 610 connected to the line $SL_x$ as a brightness control signal.

According to the above-described embodiment, one or more flip-flops 610 included in the unit driving circuits 600-1, 600-2, . . . , **600-*n*** receives the output of the flip-flop

610 connected to the previous line as an input. Accordingly, to the flip-flop 610 connected to the first line among the plurality of lines $SL_1, SL_2, \ldots, SL_n$, an ST signal Start Pulse may be input as a pulse signal. In this regard, the first line may refer to a first row or first column, or may refer to any line where brightness control occurs first.

In an embodiment, the PWM source signal selected by the multiplexer 620 from the plurality of PWM source signals may vary depending on the brightness control signal output from the flip-flop 610. For example, if the brightness control signal is 0, the multiplexer 620 may select a first PWM source signal PWM source 1, and if the brightness control signal is 1, the multiplexer 620 may select a second PWM source signal PWM source 2. In this regard, the PWM source signal selected by the multiplexer 620 based on the brightness control signal may be predetermined by a logic circuit.

Hereinbelow, a process in which the unit driving circuits 600-1, 600-2, . . . , **600-*n* receives a clock signal from a logic circuit and outputs a PWM signal will be summarized and described. When a brightness change command for adjusting the brightness of a display panel is applied to a logic circuit, the logic circuit inputs a clock signal CLK and an ST signal ST Pulse to a flip-flop 610 of the unit driving circuit 600-1 connected to a first line $SL_1$. In this regard, the logic circuit sequentially inputs the clock signal CLK to the flip-flops 610 of the unit driving circuits 600-2 to 600-*n* with a predetermined delay time interval. The flip-flop 610 of the unit driving circuit 600-1 outputs a brightness control signal to the multiplexer 620 and the flip-flop 610 of the unit driving circuit 600-2. Similarly, the flip-flops 610 of the plurality of unit driving circuits 600-2 to 600-*n* output bright control signals based on the brightness control signal input as a pulse signal Pulse and the clock signal CLK input with a predetermined delay time interval. The brightness control signal output from the flip-flop 610 is input to the multiplexer 620 to select any one of the plurality of PWM source signals PWM source 1 and PWM source 2, wherein each PWM source signals are generated to have different pulse widths by PWM source generators 615, 616, 617, 618. The selected PWM source signal is input to the PWM signal generator 630 and output as a PWM signal. The PWM signals output from the unit driving circuits 600-1, 600-2, . . . , 600-*n*** to a plurality of lines $SL_1, SL_2, \ldots, SL_n$ with predetermined delay time intervals control a supply of power to the light-emitting elements of the pixels to control the brightness of the display panel.

Figure 7:
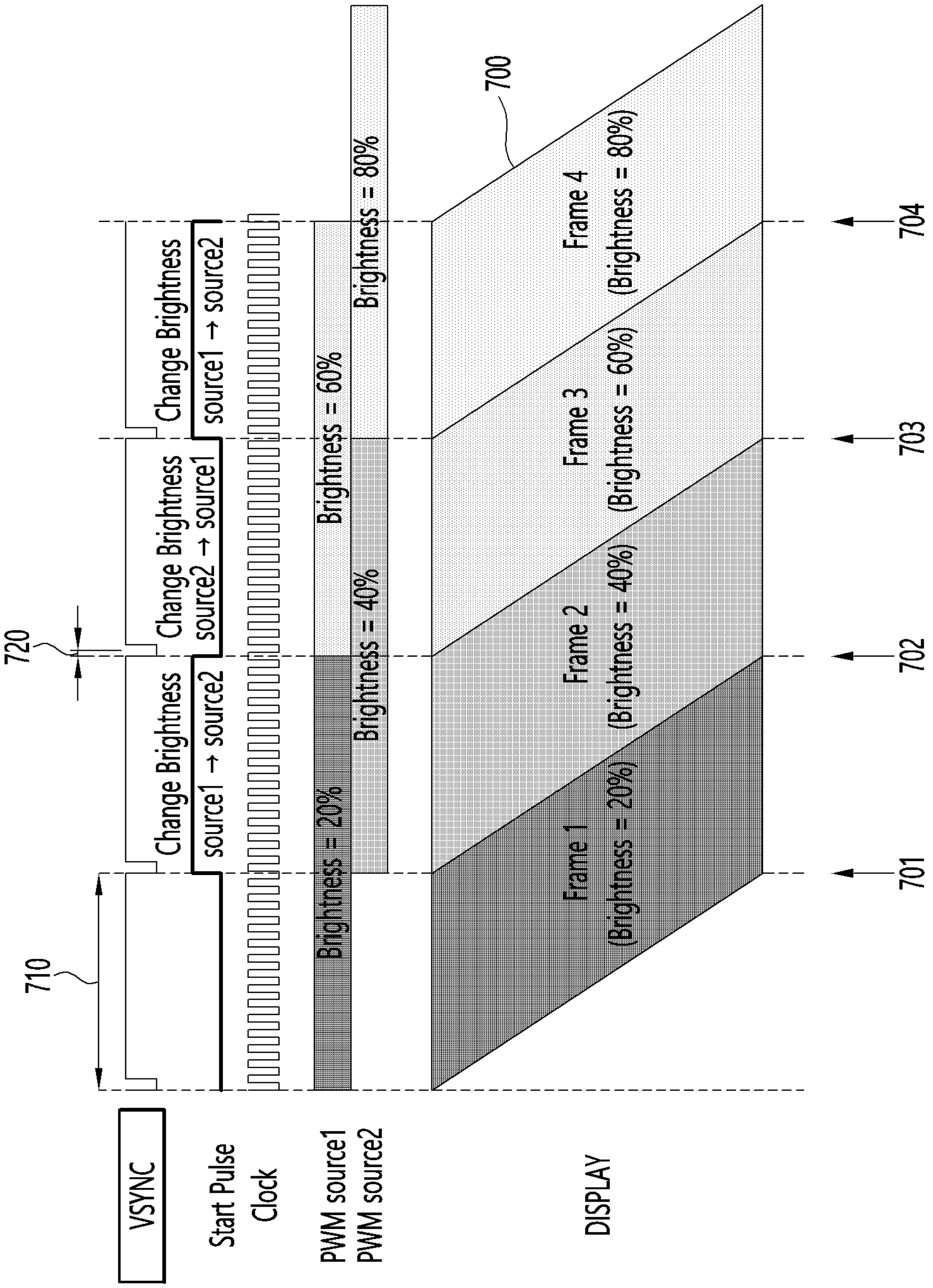
FIG. 7 is a timing diagram illustrating a method of controlling brightness using two pulse width modulation (PWM) source signals according to an embodiment of the present disclosure.

FIG. 7 is a timing diagram illustrating a method of controlling brightness using two PWM source signals according to an embodiment of the present disclosure.

Referring to FIG. 7, it may be confirmed that the natural brightness control of a display panel 700 is being performed based on a first PWM source signal and a second PWM source signal. In particular, the brightness of a plurality of lines constituting the display panel 700 is sequentially controlled based on a predetermined delay time.

In an embodiment, a predetermined delay time 720 may be set so that a clock signal is sequentially input to a plurality of flip-flops for 1 frame 710. According to this embodiment, the brightness of the display panel 700 may be maintained for 2 frames by the PWM source signal selected by the multiplexer.

Although FIG. 7 illustrates an embodiment in which a first PWM source signal is selected when a brightness control signal output from a flip-flop is 0, and a second PWM source signal is selected when a brightness control signal is 1, the present disclosure is not limited thereto, and the combination of the bright control signal and the selected PWM source signal may be varied according to various embodiments.

Referring to the last line of the display panel 700, it may be confirmed that the flip-flop connected to the last line receives a clock signal and alternately selects the PWM source signals so that the brightness of the pixels is controlled to be gradually brighter (20%, 40%, 60%, 80%). That is, the first PWM source signal at time 701, the second PWM source signal at time 702, the first PWM source signal at time 703, and the second PWM source signal at time 704 are alternately selected by the multiplexer.

Figure 8:
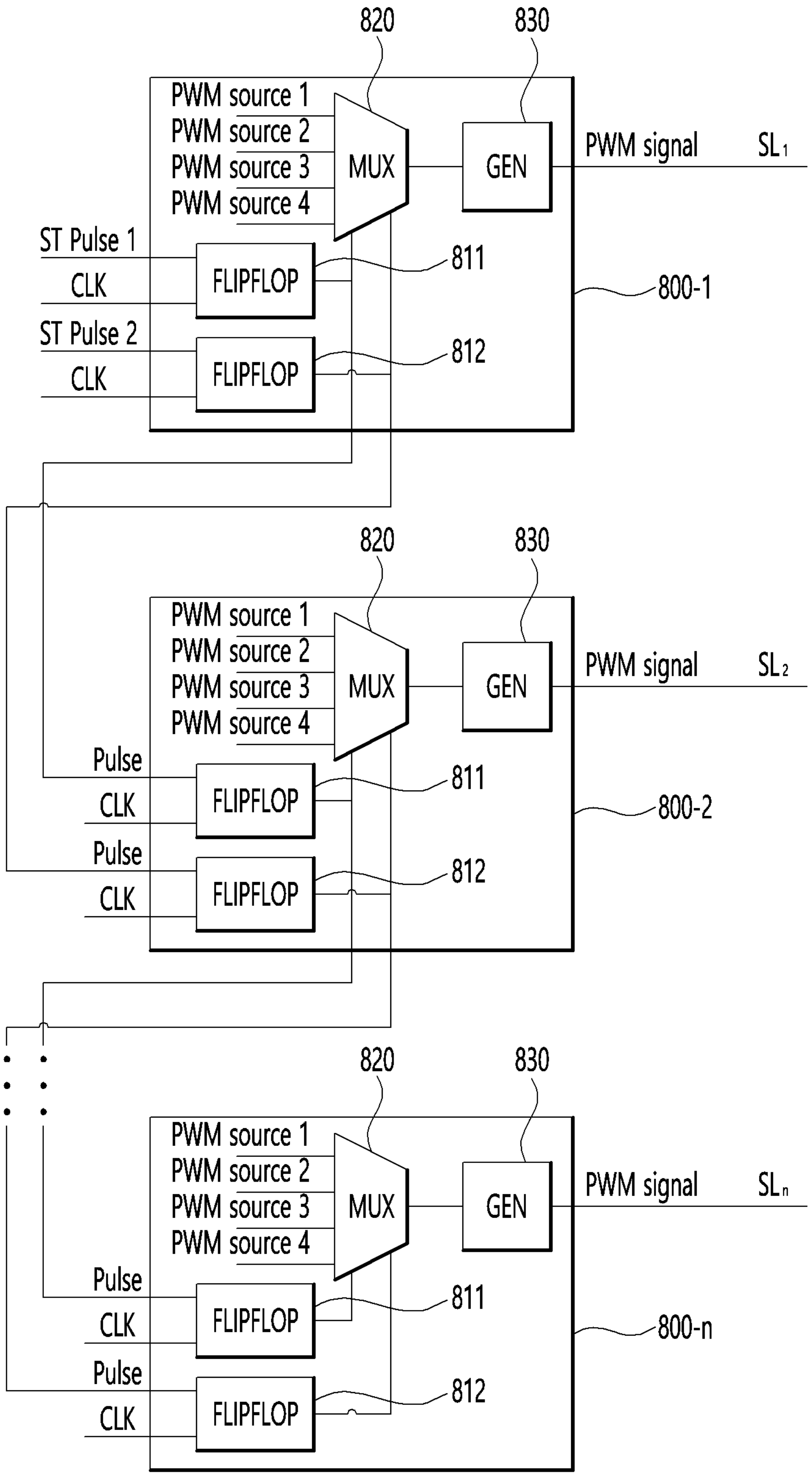
FIG. 8 is a block diagram illustrating unit driving circuits including a plurality of flip-flops according to an embodiment of the present disclosure.

FIG. 8 is a block diagram illustrating unit driving circuits including a plurality of flip-flops according to an embodiment of the present disclosure.

Although FIG. 8 illustrates an embodiment in which unit driving circuits 800-1, 800-2, . . . , **800-*n* include two flip-flops 811 and 812 and a 4:2 multiplexer 820, the number of flip-flops 811 and 812 included in the unit driving circuits 800-1, 800-2, . . . , 800-*n* and the type of multiplexer 820 are not limited thereto. Additionally, the unit driving circuits 800-1, 800-2, . . . , 800-*n* in FIG. 8 may be the same as the unit driving circuits 600-1, 600-2, . . . , 600-*n* in FIG. 6. Likewise, the flip-flops 811 and 812, the multiplexer 820, and the PWM signal generator 830 may be the same as the flip-flop 610, the multiplexer 620, and the PWM signal generator 630 in FIG. 6**.

In an embodiment, the unit driving circuits 800-1, 800-2, . . . , **800-*n* may include a first flip-flop 811 that receives a clock signal CLK from a logic circuit and outputs a first brightness control signal, and a second flip-flop 812 that receives a clock signal CLK from a logic circuit and outputs a second brightness control signal. The process by which each flip-flop 811, 812** receives the clock signal CLK and outputs the brightness control signal is the same as described above.

The brightness control signals output from the flip-flops 811 and 812 may be respectively input to flip-flops 811 and 812 on the next line.

In this regard, the multiplexer 820 may alternately select any one of a plurality of PWM source signals PWM source 1, PWM source 2, PWM source 3, and PWM source 4 based on the combination of the first brightness control signal and the second brightness control signal. Each PWM source signals are generated to have different pulse widths by PWM source generators. Additionally, the number of PWM source signals may be exponentially proportional to the number of flip-flops 811 and 812.

As an example, when the number of flip-flops 811 and 812 is m, the number of PWM source signals may be $2^m$. In this regard, as described above, the multiplexer 820 may be a $2^m$:m multiplexer.

Figure 9:
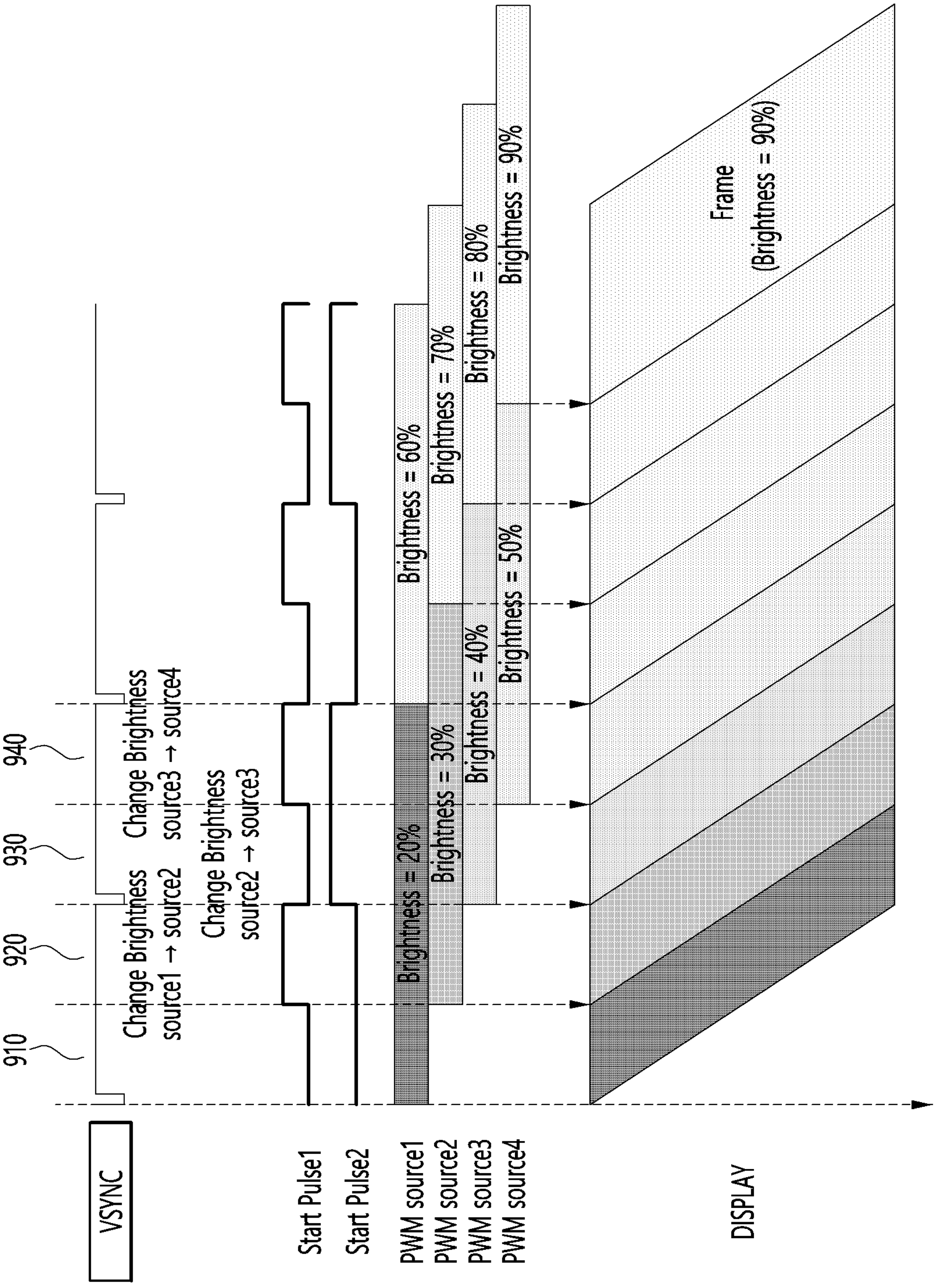
FIG. 9 is a timing diagram illustrating a method of controlling brightness using four PWM source signals according to an embodiment of the present disclosure.

FIG. 9 is a timing diagram illustrating a method of controlling brightness using four PWM source signals according to an embodiment of the present disclosure.

Referring to FIG. 9, it may be seen that the natural brightness control of a display panel is being performed based on first to fourth PWM source signals.

Assuming that the combination of brightness control signals output from a first flip-flop and a second flip-flop is indicated as (a first brightness control signal, a second brightness control signal), although FIG. 9 illustrates an embodiment in which a first PWM source signal is selected at the combination of brightness control signals of (0, 0), a second PWM source signal is selected at the combination of brightness control signals of (1, 0), a third PWM source signal is selected at the combination of brightness control signals of (0, 1), and a fourth PWM source signal is selected at the combination of brightness control signals of (1, 1), the present disclosure is not limited to this embodiment, and the combination of PWM source signals selected according to the combination of brightness control signals may be changed by various embodiments.

Additionally, referring to FIG. 9, it may be seen that the brightness control is possible even within one frame by changing the PWM source signal. Specifically, both first and second PWM source signals are used in a first frames 910 and 920, and both third and fourth PWM source signals are used in a second frames 930 and 940. According to this embodiment, the natural brightness control is possible at a faster rate than the case in which one PWM source signal is used for one frame.

In this case, a predetermined delay time may be set so that a clock signal is sequentially input to a plurality of flip-flops for ½ frame. Additionally, the brightness of a display panel may be maintained for one frame by the PWM source signal selected by the multiplexer.

At least some of the configurations (e.g., the PWM driving circuit 400, controller 140, and logic circuit 420) according to the various embodiments described above may include processors, application-specific integrated circuits (ASICs), other chipsets, logic circuits, registers, and communication modems, data processing devices, etc. known in the art to which the present disclosure pertains to execute the various control logics described above. Additionally, when the above-described control logic is implemented as software, it may be implemented as a set of program modules. In this regard, the program modules may be stored in a memory device and executed by a processor.

The logic circuits according to the various embodiments described above may be implemented by one or more processors. Additionally, the logic circuit according to the above-described embodiment may be implemented as an algorithm running on one or more processors.

Specifically, in an embodiment, at least some of the components according to the various embodiments described above include a memory storing at least one program; and a processor that performs calculations by executing at least one program. In an embodiment, the processor included in the logic circuit may control the output of the PWM signal by generating a clock signal and inputting the clock signal to unit driving circuits.

A program may include codes that are encoded in a computer language such as C/C++, C#, JAVA, Python, or machine language that a processor (CPU) of a computer may read through a device interface of the computer in order for the computer to read the program and execute methods implemented in the program. These codes may include functional codes related to functions defining the necessary functions for executing the methods, and control codes related to execution procedures necessary for the computer processor to execute the functions according to predetermined procedures. In addition, these codes may further include memory reference-related codes that indicate to which location (address) in the internal or external computer memory additional information or media required for the computer processor to execute functions should be referenced. Additionally, if the computer processor needs to communicate with any other remote computer or server to execute functions, the codes may further include a communication related code on how to communicate with any other remote computer or server using a computer communication module, on what information or media should be transmitted and received during communication, or the like.

A storage medium storing a program therein is not a medium that stores data for a short period of time, such as a register, a cache memory, etc., but a medium that stores data semi-permanently and is readable by a device. Specifically, examples of storage media include, but are not limited to, ROM, RAM, CD-ROM, magnetic tape, floppy disk, and optical data storage devices. That is, the program may be stored in various recording media on various servers that the computer may access or in various recording media on the user computer. Additionally, the storage medium may store codes that are distributed across networked computer systems so as to be computer-readable in a distributed manner.

Those skilled in the art to which the present embodiment pertains will appreciate that embodiments may be implemented in modified forms without departing from the essential features of the above description. Therefore, the spirit of the present disclosure should not be limited to the above-described embodiments, and the scope of the patent claims described below as well as all scopes equivalent to or equivalently changed from the claims fall within the scope of the present disclosure.

According to various embodiments of the present disclosure, natural brightness changes without image collision or loss are possible during the PWM driving of a display.

Additionally, according to various embodiments of the present disclosure, it is possible to naturally increase or decrease brightness even within one frame of the display.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:

a display panel including a plurality of pixels forming a plurality of rows and a plurality of columns; and a pulse width modulation (PWM) driving circuit including unit driving circuits connected to a plurality of lines corresponding to the plurality of rows or the plurality of columns, wherein the PWM driving circuit sequentially applies PWM signals output from the unit driving circuits to the plurality of lines to control brightness of pixels for each line, wherein each of the unit driving circuits comprises a multiplexer configured to select one of a plurality of PWM source signals based on the brightness.

2. The display device of claim 1, wherein each of the unit driving circuits comprises:

a flip-flop configured to output a brightness control signal.

3. The display device of claim 2, further comprising:

a logic circuit configured to input a clock signal to the flip-flop to control the output of the brightness control signal, wherein the clock signal is sequentially input to the plurality of flip-flops with predetermined delay time intervals in response to a brightness change command applied to the logic circuit.

4. The display device of claim 3, wherein the brightness of the display panel is maintained for 2 frames by the selected PWM source signal.

5. The display device of claim 3, wherein
the unit driving circuit comprises:
a first flip-flop configured to receive the clock signal from the logic circuit and output a first brightness control signal; and
a second flip-flop configured to receive the clock signal from the logic circuit and output a second brightness control signal,
wherein the multiplexer is configured to alternately select any one of the plurality of PWM source signals based on combinations of the first brightness control signal and the second brightness control signal.

6. The display device of claim 2, wherein the plurality of flip-flops are connected in a form of a scan chain to form a shift register, and the flip-flop connected to a first line of the plurality of lines is input with an ST (Start) signal as a pulse signal.

7. The display device of claim 2, wherein the unit driving circuit further comprises a PWM signal generator configured to generate the PWM signal based on the selected PWM source signal.

8. A driving circuit comprising:
at least one flip-flop configured to output a brightness control signal;
a multiplexer configured to select any one of a plurality of pulse width modulation (PWM) source signals based on the brightness control signal; and
a logic circuit configured to input a clock signal to the at least one flip-flop to control the output of the brightness control signal,
wherein the clock signal is sequentially input to the at least one flip-flop with predetermined delay time intervals in response to a brightness change command applied to the logic circuit.

9. The driving circuit of claim 8, wherein
the at least one flip-flop comprises:
a first flip-flop configured to receive the clock signal from the logic circuit and output a first brightness control signal; and
a second flip-flop configured to receive the clock signal from the logic circuit and output a second brightness control signal,
wherein the multiplexer is configured to alternately select any one of the plurality of PWM source signals based on combinations of the first brightness control signal and the second brightness control signal.

* * * * *